Jan. 4, 1966     O. VON ZELEWSKY ETAL     3,226,766
PLASTICIZING AND CONVEYING DEVICE

Filed Feb. 13, 1963                              3 Sheets-Sheet 1

INVENTORS:
Ottomar von Zelewsky
Werner Burkert
BY

Jan. 4, 1966  O. VON ZELEWSKY ETAL  3,226,766
PLASTICIZING AND CONVEYING DEVICE
Filed Feb. 13, 1963
3 Sheets-Sheet 2

INVENTOR
Ottomar von Zelewsky
Werner Burkert
BY

United States Patent Office 3,226,766
Patented Jan. 4, 1966

3,226,766
PLASTICIZING AND CONVEYING DEVICE
Ottomar von Zelewsky, Neuhausen am Rheinfall, and Werner Burkert, Schaffhausen, Switzerland, assignors to Georg Fischer Aktiengesellschaft, Schaffhausen, Switzerland
Filed Feb. 13, 1963, Ser. No. 258,190
Claims priority, application Switzerland, Feb. 16, 1962, 1,920/62
6 Claims. (Cl. 18—12)

The present invention relates to a plasticizing and conveying device for thermoplastic synthetic materials which includes a housing and a conveyor worm rotating therein.

Worm presses for processing synthetic material are known which operate in a conventional or polytropic manner. According to these worm presses, the synthetic material is heated and plasticized by heat introduced from the outside into the housing and into the worm. In order to heat the material which is a poor heat conductor to corresponding temperatures ranging ordinarily around 200° C., a considerably high temperature drop is required between the medium which gives off heat and the medium which absorbs heat. With this design of worm presses, there exists the danger that the synthetic material is locally overheated and will disintegrate in conformity with the extent to which it has been overheated. In an effort to counter this situation, worm presses have been employed in which the synthetic material is carefully over a long path by means of heat exchanging surfaces heated to the necessary temperature. Such an arrangement, however, leads to extremely large dimensions of the corresponding worm presses. In order to overcome this drawback, worm presses have been developed which operate in an autogenous manner. According to these last mentioned worm presses, the material is practically without heat supply from outside heated in the worm press to the necessary temperature so that it will be suitable for injection molding. The autogenous working worm presses supply heat to the material by friction, and it is for this reason that the rotational speed of the worm is considerably higher than the rotational speed heretofore employed with the other above mentioned worms. More specifically, these higher speeds of rotation range from 250 to 3,000 r.p.m. for worm diameters ranging from 65 to 8 millimeters. The heretofore employed autogenous worm presses have axially fixedly journalled worms which, depending on the material to be employed, have a shorter or longer length and are additionally heatable for starting the operation.

It is an object of the present invention to provide an autogenous operable device which will have a considerably more compact construction than heretofore known autogenous devices of the type involved.

It is also an object of this invention to provide an autogenous device for plasticizing and feeding synthetic material, which can be controlled in a very simple manner.

These and other objects and advantages of the invention will appear more clearly from the following specification in connection with the accompanying drawings, in which:

FIG. 1 diagrammatically illustrates an axial section through the conveying and injection molding parts of an autogenous worm press according to the present invention with said parts occupying a pressing position and intended for high output.

General arrangement

Figure 1:
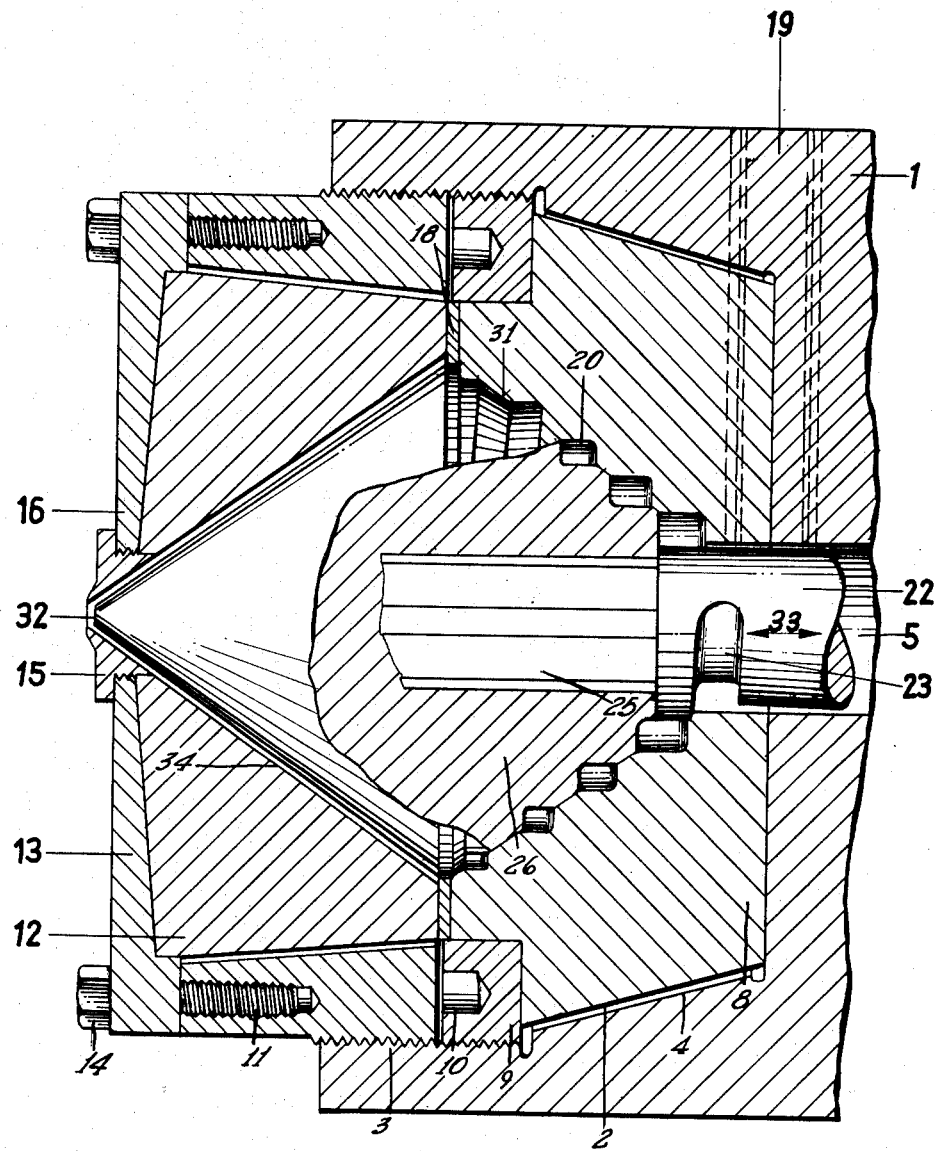

The plasticizing and feeding device according to the present invention is characterized primarily in that the conveyor worm increases in diameter in a conical way in the feeding direction and is followed by an element connected thereto and having its diameter conically decrease from the maximum diameter of said conically broadening portion of the conveyor worm.

Structural arrangement

Referring now to the drawing in detail, the arrangement shown therein comprises a housing 1 of a worm press which is provided with a recess 2 the front portion 3 of which is cylindrical while the rear or bottom portion 4 is conical. Housing 1 furthermore comprises a bore 5 for receiving a driving shaft 22.

The recess 2 serves for receiving an insert or housing conveyor part 8 which, by means of an outer threaded ring 9, is firmly held in the bottom portion 4 of housing 1. Ring 9 is provided with bores 10 for receiving a wrench to thereby permit screwing the ring 9 into the housing 1. A connecting ring 11 provided with an outer thread is subsequently screwed against the ring 9 in housing 1. This connecting ring 11 serves as carrier for connecting a head part and nozzle holder 13. This holder 13 in its turn serves for pressing a housing head 12 against a spacer disc 18 which latter rests upon the housing conveyor part 8. Holder 13 is connected to ring 11 by means of screws 14. Holder 13 has a central threaded bore 16 in which is inserted an injection nozzle 15 provided with an outer thread.

As will be evident from FIG. 1, an air insulated feeding passage 19 extends through housing 1 and the housing feeding part 8. Housing part 8 is provided with a spiral groove 20.

Figures 3, 4:
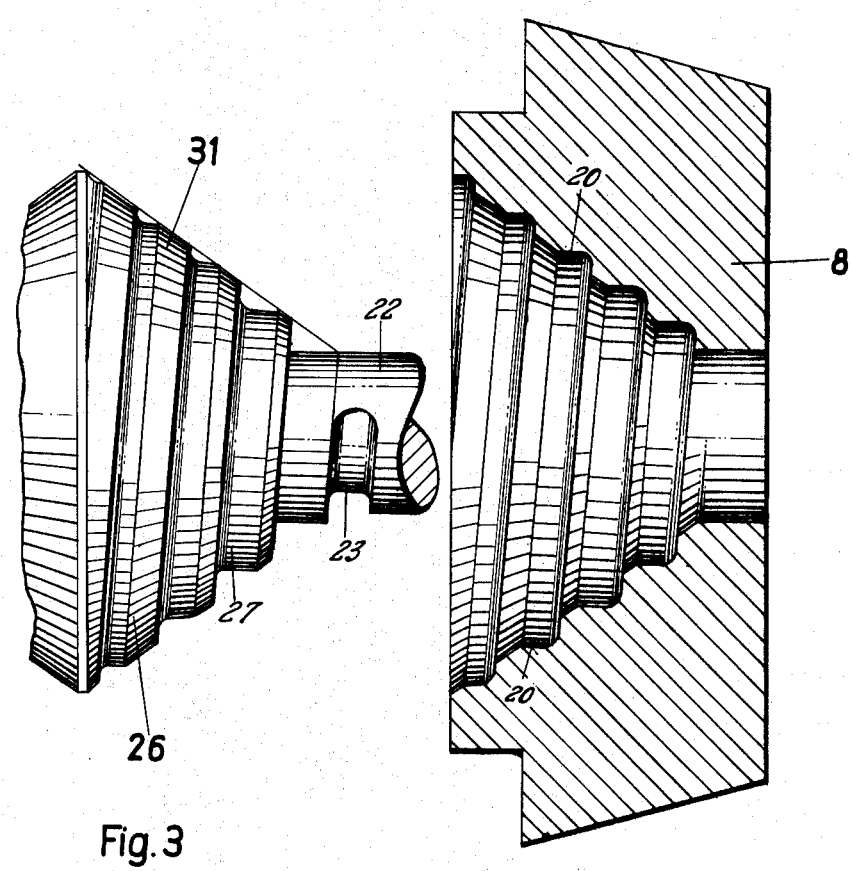
FIG. 3 is a view of the conveying worm in the arrangement of FIG. 1.
FIG. 4 represents a section through the housing insert pertaining to the feeding worm.

The drive shaft 22 (only the front portion being visible) has a feeding groove 23 and is provided with a wedge path 25 for holding a double cone 26. The rear portion of said double cone has a spiral groove 27 (see FIG. 3) which is designed corresponding to the spiral groove 20. Thus, as will be evident from FIG. 1, overlapping passages are formed between cone and housing. The double cone is composed of a feeding cone 31 and a plasticizing cone 32, the plasticizing cone 32 having a smooth surface. The outwardly tapering cone 32 extends into the injection nozzle 15. The position of the double cone 26 keyed and connected to drive shaft 22 may be variable with regard to the housing by means of drive shaft 22 reciprocable in the direction of the double arrow 33. In this way, it is possible to vary the intermediate chamber 34 confined by the housing head 12 and the plasticizing cone 32. This change may be effected between zero and a maximum value.

Figure 2:
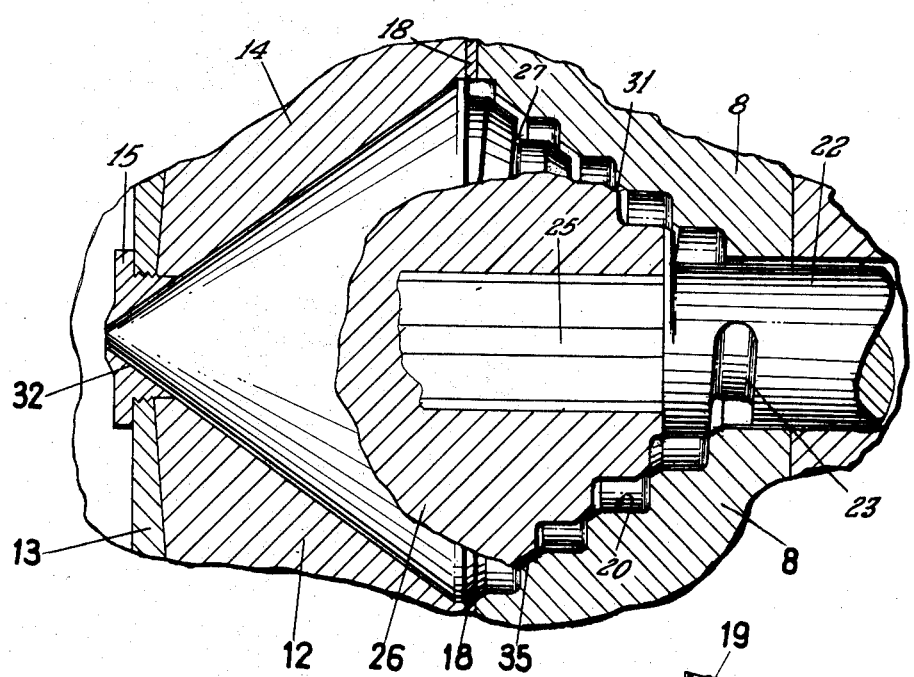
FIG. 2 illustrates a portion of the device of FIG. 1 but in idling position.

As will be evident from FIG. 2, when nozzle 15 is closed, the spiral grooves confine short-circuited passages 35 which, depending on their free cross section defined by the axial position of the double cone 26, are able to reduce the delivery of the conveying cone 31 to a more or less extent and are even able to reduce the delivery of the conveying or feeding cone 31 to zero.

Figure 6:
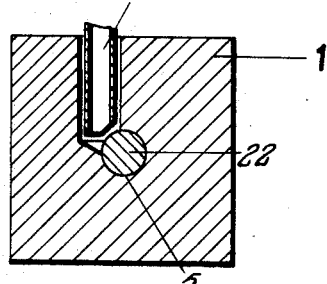
FIG. 6 is a section along the line VI—VI of FIG. 5.

During the injection molding operation, the synthetic starting material will, during the rotation of the drive shaft 22, pass through the feeding or supply passage 19. At approximately the tangential entrance of this passage 19 into the bore 5 (see FIG. 6), the synthetic material is caught by the feed groove 23 and conveyed to the feeding or conveying cone 31 which latter conveys the material to the nozzle 15. During its path to the nozzle 15, the material is heated by friction so that after reaching a certain minimum temperature the material becomes plastic. This condition is desired at the end of the conveying cone 31, i.e. directly prior to reaching the plasticizing cone 32. In cone 32, a further heating of the plastic material will occur so that said plastic material when leaving the nozzle 15 will have the desired temperature.

In contrast to the heretofore known worm presses fitted with a fixed running play, according to the present invention the injection molding output will for injection molding synthetic material be controlled by means of the axial displaceability of drive shaft 22 and cones 31 and 32 connected to said shaft 22. A coarse temperature control of the plastic synthetic material is effected at the nozzle mouth by means of a spacer disc 18 which is designed and inserted in conformity with the synthetic material to be molded. By changing the thickness of this disc 18, it will be possible to vary the ratio of the width of the gap between head 12 and the intermediate chamber 34 to that of the short-circuited passages 35 at a predetermined axial position of the drive shaft 22 in conformity with the specific properties of the synthetic material being molded.

Figure 5:
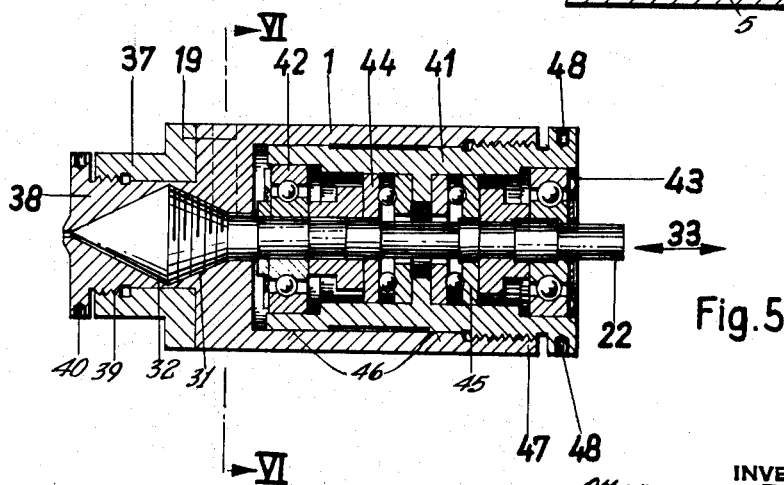
FIG. 5 represents on a considerably smaller scale than FIGS. 1 to 4 a longitudinal section through a modified worm press according to the invention with the bearing and control means therefor.

FIG. 5 illustrates in conformity with a modification of the present invention a control device for varying the injection molding output.

As will be evident from FIG. 5, a flanged sleeve 37 is screwed onto the front portion of housing 1, said sleeve forming the seat of a front closure member 38. This closure member or nozzle 38 is provided with a thread 39 and with bores 40 for permitting the handling of member 38 by means of a wrench.

The drive shaft 22 with the cones 31 and 32 is rotatably journalled on radial ball bearings 42 and 43 and two axial or thrust ball bearings 44 and 45 in a bearing cage 41. Cage 41 slides with fitting surface 46 in housing 1. The rear portion of cage 41 is provided with a thread 47 and with a flange which is provided with circumferentially evenly distributed bores 48. By means of a wrench engaging the bores 40, the member 38 in housing 1 or flanged sleeve 37 may be rotated and axially displaced back and forth. This makes it possible in a most simple manner to displace the housing parts relative to the cones 31 and 32 and thus to adapt the worm press to the particular properties of the respective synthetic material being molded. This applies in particular to adapting the temperature of the plasticized synthetic material to the respective requirements. In an analogous manner, by means of the bores 48, the bearing cage 41 may by rotation, axially be displaced in housing 1 in either direction and by means of cage 41, also an axial adjustment of shaft 22 with cones 31 and 32 may be effected. In this way, the injection molding output of the injection press may in a very simple manner be adjusted according to the requirements. It is also possible by means of a pinion and an adjusting motor (not illustrated) to rotate cage 41.

In view of the high circumferential speeds of approximately from 15 to 25 meters per second within the range of the double cone base surface, which with a base surface diameter of from 100 to 150 millimeters correspond to a speed of the drive shaft of approximately 1000 r.p.m., very high speed gradients will occur in the introduced synthetic starting material, which means that high friction energies will be created. The now injection moldable synthetic material will then through the hollow conical chamber 34 in form of a film of high homogeneity be conveyed to the injection nozzle 15. The speed gradients occurring in the feeding as well as in the plasticizing cone are sufficient to convey to the material the necessary friction energy and thereby to bring said material into the desired plasticized condition.

In spite of the fact that the free volume of the device between the feed-in groove 23 and the nozzle 15 is rather small, the output per time unit of a worm press according to the invention will due to the high speed of the worm be rather high. This worm press, therefore, has the advantage to reduce the treatment time of the synthetic material to a minimum which is of particular importance when dealing with thermally sensitive synthetic materials. By means of this high speed double cone worm press the temperature of the synthetic material can, due to the very low time influence within the plasticizing period, be heated up to a temperature which is approximately 50° C. higher than is the case with the heretofore known worm presses. Furthermore, in view of the fact that the two cones are movable back and forth in axial direction, a fine control will be possible which may be taken advantage of by means of temperature feelers for automatically controlling said axial movement.

Instead of the one-part double cone illustrated in FIGS. 1 and 2, a double cone may be employed which is composed of two separate truncated cones. It has been found advantageous to make these cones of heat-insulating material, preferably oxide ceramic as for instance $Al_2O_3$ or $Mg_3O_4$, in order to prevent heat energy from flowing toward the inlet in view of the high temperature drop between the inlet and the outlet of the double cone. The opening angle of the two cones amount advantageously to at least 40°.

It is, of course, to be understood that the present invention is, by no means, limited to the particular constructions shown in the drawings but also comprises any modifications within the scope of the appended claims. Thus, while the journalling of the arrangement according to the present invention has been shown in FIG. 5 with a slightly modified press, the same type of journalling may also be used in connection with the arrangement of FIGS. 1 to 4. Furthermore, while with the device described above the control of quantity and temperature is effected by means of a movable axially displaced part or an inserted member in form of a spacer disc, it is also possible to arrange such spacer disc between the base surfaces of the two cones.

What we claim is:

1. A device for conveying and extruding thermoplastic synthetic materials, which comprises: rotatable conveying worm means increasing in diameter in conveying direction thereof for conveying the material while simultaneously plasticizing the material, housing means having a first conical cavity receiving said worm means and confining therewith a conveying passage, means at the smaller end of said first cavity for feeding said material thereto, conical means fixed to said worm means and having its axis extending in the longitudinal direction of the axis of rotation of said worm means and having its largest diameter adjacent the largest diameter of said worm means, said housing means having a second conical cavity receiving said conical means and confining therewith passage means for communication with said conveying passage, said conical means and said second cavity having smooth opposed surfaces, injection nozzle means mounted in said housing means surrounding the tip portions of said conical means and communicating with the apex end of said second conical cavity, and means for rotating said worm means and conical means.

2. A device for conveying and extruding thermoplastic synthetic materials, which comprises: rotatable conveying worm means increasing in diameter in conveying direction thereof for conveying the material while simultaneously plasticizing the material, housing means having a first conical cavity receiving said worm means and confining therewith a conveying passage, means at the smaller end of said first cavity for feeding said material thereto, conical means fixed to said worm means and having its axis extending in the longitudinal direction of the axis of rotation of said worm means and having it largest diameter adjacent the largest diameter of said worm means, said housing means having a second conical cavity receiving said conical means and confining therewith passage means for communication with said conveying passage, said conical means and said second cavity having smooth opposed surfaces, injection nozzle means mounted in said housing means surrounding the tip portion of said conical means and communicating with the apex end of said said second conical cavity, means for rotating said worm means and conical means, shaft means supporting said worm means and said conical means, means rotatably supporting said shaft means, and means for adjusting said shaft means axially to control the clearance between the worm means and the conical means and the respective cavities therefor in said housing means.

3. A device for conveying and extruding thermoplastic synthetic materials, which comprises: rotatable conveying worm means increasing in diameter in conveying direction thereof for conveying the material while simultaneously plasticizing the material, housing means having a first conical cavity receiving said worm means and confining therewith a conveying passage, means at the smaller end of said first cavity for feeding said material thereto, conical means fixed to said worm means and having its axis extending in the longitudinal direction of the axis of rotation of said worm means and having its largest diameter adjacent the largest diameter of said worm means, said housing means having a second conical cavity receiving said conical means and confining therewith passage means for communication with said conveying passage, said conical means and said second cavity having smooth opposed surfaces, injection nozzle means mounted in said housing means surrounding the tip portion of said conical means and communicating with the apex end of said second conical cavity, and means for rotating said worm means and conical means, said worm means and said conical means being formed of heat insulating material.

4. A device for conveying and extruding thermoplastic synthetic materials, which comprises: rotatable conveying worm means increasing in diameter in conveying direction thereof for conveying the material while simultaneously plasticizing the material, housing means having a first conical cavity receiving said worm means and confining therewith a conveying passage, means at the smaller end of said first cavity for feeding said material thereto, conical means fixed to said worm means and having its axis extending in the longitudinal direction of the axis of rotation of said worm means and having its largest diameter adjacent the largest diameter of said worm means, said housing means having a second conical cavity receiving said conical means and confining therewith passage means for communication with said conveying passage, said conical means and said second cavity having smooth opposed surfaces, injection nozzle means mounted in said housing means surrounding the tip portion of said conical means and communicating with the apex end of said second conical cavity, and means for rotating said worm means and conical means, said worm means and said conical means being formed of an oxide ceramic material so as to have low temperature conducting characteristics.

5. A device for conveying and extruding thermoplastic synthetic materials, which comprises: rotatable conveying worm means increasing in diameter in conveying direction thereof for conveying the material while simultaneously plasticizing the material, housing means having a first conical cavity receiving said worm means and confining therewith a conveying passage, means at the smaller end of said first cavity for feeding said material thereto, conical means fixed to said worm means and having its axis extending in the longitudinal direction of the axis of rotation of said worm means and having its largest diameter adjacent the largest diameter of said worm means, said housing means having a second conical cavity receiving said conical means and confining therewith passage means for communication with said conveying passage, said conical means and said second cavity having smooth opposed surfaces, injection nozzle means mounted in said housing means surrounding the tip portion of said conical means and communicating with the apex end of said second conical cavity, and means for rotating said worm means and conical means, said first conical cavity having spiral groove means therein of the opposite hand to that of said worm, and the spiral groove means of said first cavity and the thread on said worm both decreasing in cross section in the direction of movement of material along said worm.

6. A device for conveying and extruding thermoplastic synthetic materials, which comprises: rotatable conveying worm means increasing in diameter in conveying direction thereof for conveying the material while simultaneously plasticizing the material, housing means having a first conical cavity receiving said worm means and confining therewith a conveying passage, means at the smaller end of said first cavity for feeding said material thereto, conical means fixed to said worm means and having its axis extending in the longitudinal direction of the axis of rotation of said worm means and having its largest diameter adjacent the largest diameter of said worm means, said housing means having a second conical cavity receiving said conical means and confining therewith passage means for communication with said conveying passage, said conical means and said second cavity having smooth opposed surfaces, injection nozzle means mounted in said housing means surrounding the tip portion of said conical means and communicating with the apex end of said second conical cavity, and means for rotating said worm means and conical means, said housing means being formed in two parts and being interconnected substantially in the plane of the largest diameter of said worm means, said housing parts being axially adjustable relative to each other to control the clearance between the cavities of the housing part and the said worm means and conical means.

References Cited by the Examiner

UNITED STATES PATENTS

| | | | |
|---|---|---|---|
| 2,688,154 | 9/1954 | Huckfeldt | 18—14 |
| 3,008,187 | 11/1961 | Slade | 18—12 X |

FOREIGN PATENTS

| | | |
|---|---|---|
| 1,013,865 | 8/1957 | Germany. |
| 862,941 | 3/1961 | Great Britain. |
| 560,957 | 4/1957 | Italy. |

OTHER REFERENCES

Sackett, R. D.: Speaking of Extrusion, in S.P.E. Journal, November 1957, pp. 49–51.

J. SPENCER OVERHOLSER, *Primary Examiner.*

WILLIAM J. STEPHENSON, *Examiner.*